(12) United States Patent
Ping et al.

(10) Patent No.: US 11,288,004 B1
(45) Date of Patent: Mar. 29, 2022

(54) CONSENSUS-BASED AUTHORITY SELECTION IN REPLICATED NETWORK-ACCESSIBLE BLOCK STORAGE DEVICES

(71) Applicant: Amazon Technologies, Inc., Seattle, WA (US)

(72) Inventors: Fan Ping, Kenmore, WA (US); Marc Brooker, Seattle, WA (US); Tao Chen, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 16/818,728

(22) Filed: Mar. 13, 2020

(51) Int. Cl.
*G06F 3/06* (2006.01)
*G06F 11/07* (2006.01)

(52) U.S. Cl.
CPC .............. *G06F 3/065* (2013.01); *G06F 3/067* (2013.01); *G06F 3/0607* (2013.01); *G06F 3/0617* (2013.01); *G06F 3/0664* (2013.01); *G06F 11/0727* (2013.01); *G06F 11/0757* (2013.01)

(58) Field of Classification Search
CPC ...... G06F 3/065; G06F 3/0607; G06F 3/0617; G06F 3/0664; G06F 3/067; G06F 11/0727; G06F 11/0757
USPC ......................................................... 711/154
See application file for complete search history.

(56) References Cited

U.S. PATENT DOCUMENTS

| | | | | |
|---|---|---|---|---|
| 2011/0145383 | A1* | 6/2011 | Bishop | H04L 41/069 709/223 |
| 2013/0290249 | A1* | 10/2013 | Merriman | G06F 16/278 707/610 |
| 2016/0203202 | A1* | 7/2016 | Merriman | G06F 11/0709 714/20 |
| 2016/0255144 | A1* | 9/2016 | Brandwine | H04L 67/1097 709/226 |
| 2018/0091586 | A1* | 3/2018 | Auradkar | H04L 67/1095 |

* cited by examiner

*Primary Examiner* — Than Nguyen
(74) *Attorney, Agent, or Firm* — Knobbe, Martens, Olson & Bear, LLP

(57) ABSTRACT

Systems and methods are provided to manage replicas of a virtualized block storage volume. The master replica of the virtualized block storage volume can heartbeat with each secondary replica of the virtualized block storage volume to provide an indication of the status of the master replica. Each secondary replica can reply to the heartbeat of the master replica. Each replica can be configured to request an updated replica configuration based on not receiving a heartbeat from one of the replicas. The master replica can request an updated replica configuration after a first time period without receiving a reply from one of the secondary replicas and each secondary replica can request an updated replica configuration after a second time period without receiving a communication from the master replica. Use of the heartbeat process between the master replica and the secondary replicas can increase system speed or reduce power consumption.

20 Claims, 6 Drawing Sheets

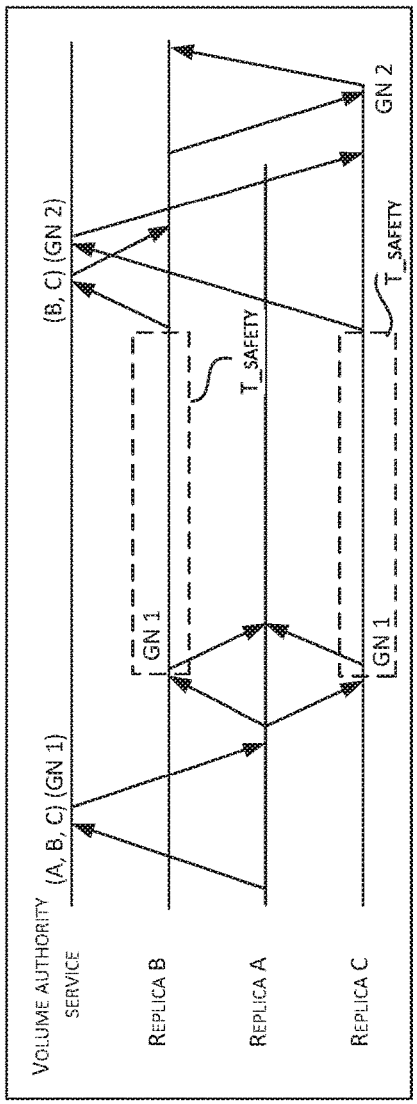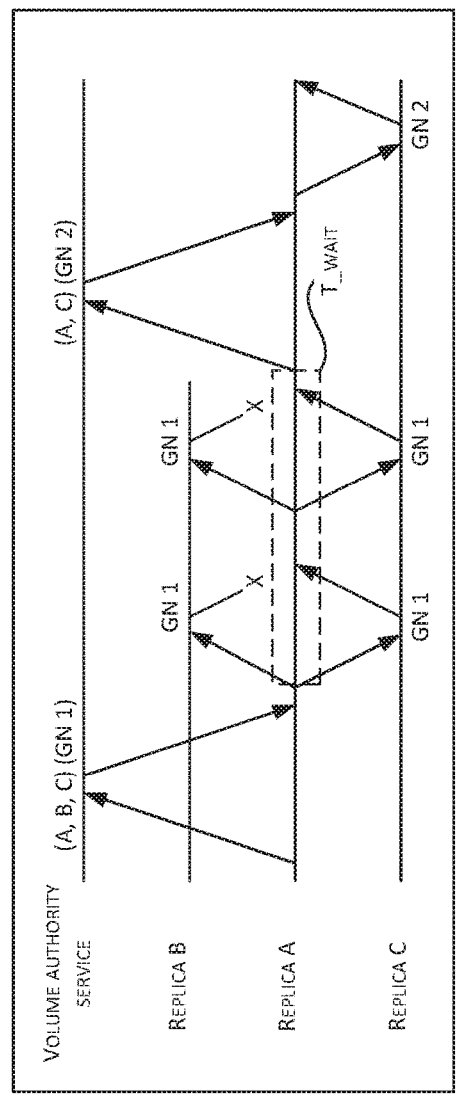
FIG. 3A
FIG. 3B

CONSENSUS-BASED AUTHORITY SELECTION IN REPLICATED NETWORK-ACCESSIBLE BLOCK STORAGE DEVICES

BACKGROUND

Cloud computing is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is higher or the user bandwidth requirements are lower.

Cloud computing environments may provide various guarantees concerning the availability and durability of various computing resources. To facilitate these guarantees, a cloud computing environment may make a number of replicas of the various computing resources available to users. For example, where an environment provides virtualized block storage devices (sometimes referred to as logical storage "volumes" or as virtualized block storage volumes), the cloud computing environment may provide a plurality of replicas of the logical volume to ensure availability of the volume. The plurality of replicas may be configured such that one replica is the master replica and another one or more replicas are secondary replicas. To facilitate consistency of the plurality of replicas of the volume, it may be desirable that only one replica be designated as master at any given time.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

FIG. 3A contains an illustration of example interactions between replicas of a logical volume including failure of a master replica.

FIG. 3B contains an illustration of example interactions between replicas of a logical volume including failure of a secondary replica.

DETAILED DESCRIPTION

Figure 1:
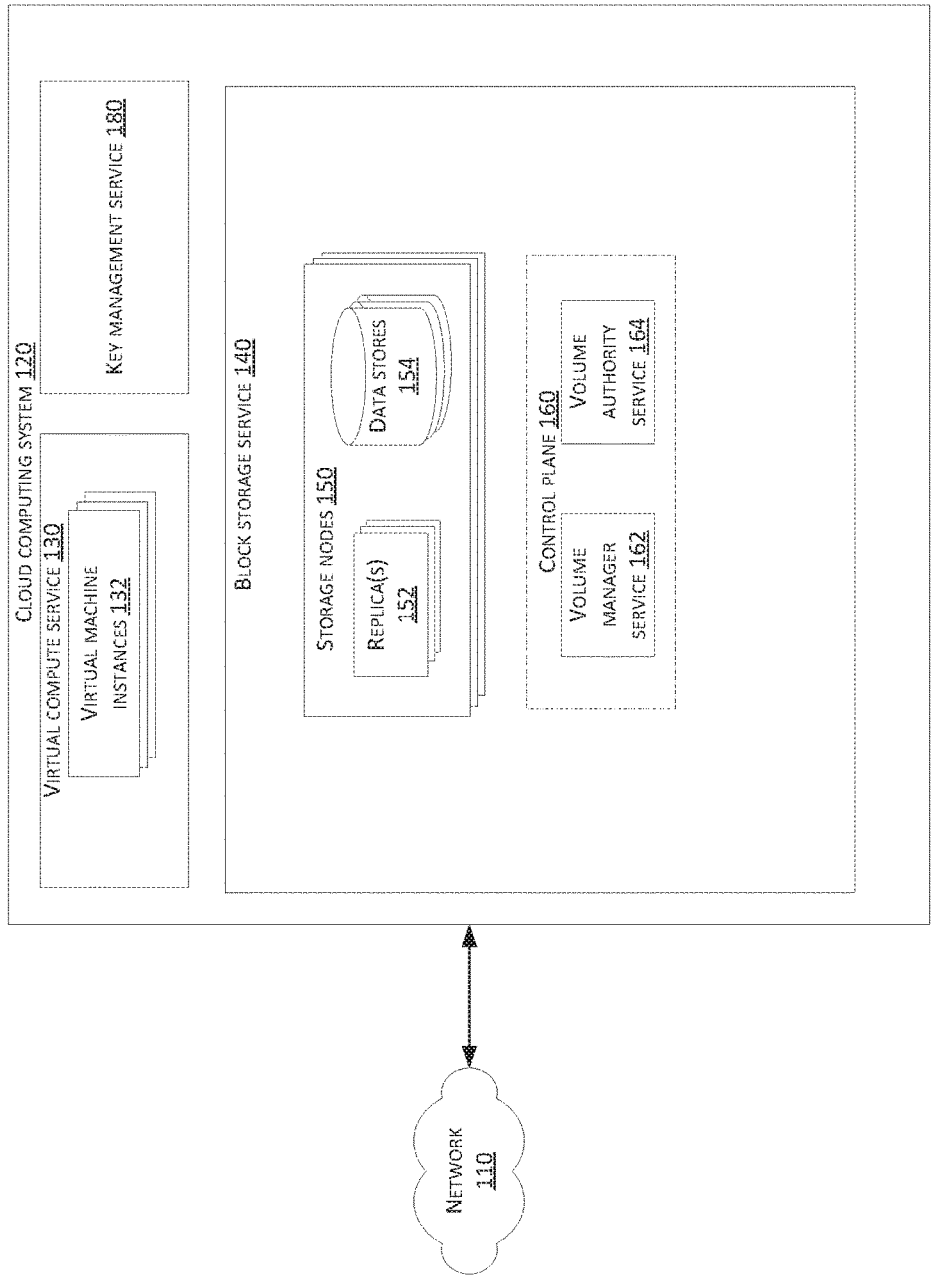
FIG. 1 depicts a schematic diagram of a cloud computing system, including a block storage service configured to implement virtualized block storage volumes in accordance with aspects of the present disclosure, which devices are replicated to include a master replica and one or more secondary replicas.

The present disclosure generally relates to managing a logical block storage device (a "volume") stored in a distributed computing environment and replicated across multiple replicas. To ensure consistency of the volume, a single replica is designated as a "master" or "primary" replica, and handles all writes to (and potentially all reads from) the volume. Writes to the volume are then replicated at other replicas, which are designated "secondary" replicas. The set of replicas implementing a volume, and the designation of authority between replicas (e.g., as primary/master or secondary) can generally be referred to as a "replica configuration" of the volume. Because having only a single replica designated as master ensures consistency, having each replica agree as to the current replica configuration can be important. One mechanism for designating only a single master replica is to utilize a strongly consistent data store to store the replication configuration. The strongly consistent data store may hold an authoritative record of the replica configuration, and each replica can be configured to implement that replica configuration. By identifying a replica as a master within the authoritative record, the strongly consistent data store can be said to "grant" master status to a replica. However, the grant of master replica status ensures only that the respective replica is authorized to be the master replica (e.g., identified as such in the authoritative record) and does not ensure that the respective replica is acting as the master replica. This leaves potential for a lack of synchronization between the strongly consistent data store and the replicas themselves (e.g., where the data store indicates that a replica is acting as master, but that replica is unhealthy), which can lead to difficult to diagnose issues. One mechanism for ensuring that a replica designated as master is actually acting as master is to utilize an external system to periodically check the health of the master replica, and to prompt selection of a new master replica if the current master replica is unhealthy. However, creation of such an external system can increase complexity and resource consumption within the system. The present disclosure provides an alternative (or additional) approach, in which replicas themselves are utilized to detect failures among the set of replicas for a volume, and to facilitate selection of a new set of replicas for the volume if required. Specifically, replicas associated with a volume can communicate between one another according to the protocols and mechanisms disclosed herein, such that individual replicas can detect an adverse event at another replica and can request an updated replica configuration reflecting the non-adversely affected replicas. Thus, the replica configuration for a volume can be maintained by the replicas themselves, without requiring an external system to verify replica health.

In general, a volume can correspond to a logical collection of data, such as a set of data maintained on behalf of a user, represented as a network-accessible block storage device. The data of the volume may be replicated between multiple devices within a distributed computing system, in order to provide multiple replicas of the volume (where such replicas may collectively represent the volume on the computing system). Replicas of a volume in a distributed computing system can beneficially provide for automatic failover and recovery, for example by allowing the user to access either a master replica of the volume or a secondary replica of the volume that is synchronized to the master replica at a block level, such that a failure of either the primary or secondary replica does not inhibit access to the information of the volume. The role of the primary volume can be to facilitate reads and writes (sometimes referred to as "input output operations," or simply "I/O operations") at the volume for attached clients, and to propagate any writes to the secondary (preferably synchronously in the I/O path, although asynchronous replication can also be used). The secondary replica can be updated synchronously with the master replica and provide for seamless transition during failover operations, whereby the secondary replica assumes the role of the master replica, and either the former master is designated as the secondary or a new replacement secondary replica is provisioned. Although many examples herein discuss a master replica and a secondary replica, it will be appreciated that a logical volume can include multiple secondary replicas.

A corresponding system may include a plurality of computing devices configured to implement a block-based storage system, wherein at least one of the computing devices is configured to implement a membership group authority for the block-based storage system. The computing devices of the block-based storage system store primary and secondary replicas of logical volumes or partitions of logical volumes hosted by the block-based storage system. As used herein, a server "hosting" a replica or a volume refers to the server storing at least a portion (e.g., a partition, a set of blocks) of the data of the volume and implementing instructions for managing the volume (e.g., I/O to and from the volume, replication of the volume, transfer of volume data to and from external storage systems).

In some embodiments, the block-based storage system may support two-way replication wherein data for a logical volume or logical volume partition is stored on two separate nodes, wherein one node stores a master replica and another node stores a secondary replica. In some embodiments, a block-based storage system may support N-way replication, wherein one node stores a master replica of data for a logical volume or logical volume partition and "N" additional nodes store "N" replicas of the data for the logical volume or the logical volume partition, wherein "N" is a number equal to or greater than two. In some embodiments, computing instances of a virtualized computing service attach or connect to a virtual volume hosted by the block-based storage system such that the virtual volume appears to the instance as a locally attached storage device. Each instance can use a client to virtualize its IO to the volume. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance. Regarding the offload card, in some implementations, at least a subset of virtualization management tasks may be performed at one or more offload cards so as to enable more of the processing capacity of a host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management, input/output virtualization to network-attached storage volumes, local migration management tasks, instance health monitoring, and the like.

Instances may connect or attach to a volume via a first set of computing device (e.g. one or more storage hosts or nodes) that collectively store a master replica of the volume. Read requests and write requests may be serviced only by a computing device of the block-based storage system that stores the master replica of the volume.

A block-based storage system may be configured to connect multiple instances to a same logical volume at the same time. For example, the block-based storage system may be configured to connect both a first instance and a second instance to the same volume, where both instances attach to the master replica, which in turn replicates any changes to the secondary replicas. Both instances concurrently connected to the volume may send write requests to write data to the volume or read data from the volume. Such a configuration can be referred to as a "multi-attach" configuration, as a replica can have multiple attachments (each to a different instance) at the same time. The block-based storage system may guarantee consistency, meaning that any response to a read request received after a write request has been committed will include any changes affected by the write request, and that any read response to a read request received prior to a write being committed will not include changes affected by the yet-to-be committed write.

One mechanism for ensuring health of a master replica might be to rely on a client to verify health of that master replica. If the client cannot communicate with the master replica, the replica might be considered to have failed (even if the replica is, in fact, healthy). However, in situations where multiple instances can connect to a replica, issues such as non-system-wide network failures (e.g., network partitions) may lead some clients to detect a replica as unhealthy, while others detect the replica as healthy. Thus, using instances or their I/O virtualization clients to verify replica health in a multi-attach configuration can be problematic as different ones of those can come to different conclusions about the health of a given replica, potentially leading to a scenario where different instances consider different replicas to be the master replica. For example, if there is inconsistency amongst the instances regarding which replica is the master replica of the volume, then data read from one replica may not reflect writes made to the other replicas. As another example, if network conditions or errors at a particular client prevent connection of the particular client to the master replica, even though the master replica is still healthy (e.g., able to serve I/O), the particular client may initiate a failover to the secondary replica, which would assume the role of the master replica. In this example, both the master replica and the secondary replica would consider themselves to be the master replica. Existing connections between the original master replica and other clients may trigger failover back to the original master. This "flip flop" of which replica assumes the role of master can cause system inefficiencies such as latency in serving I/O and unnecessary usage of network connections between distributed computing devices including the clients, the replicas, and any control plane components involved in failover.

The above described problems are addressed in some embodiments by the disclosed techniques for implementing a consensus-based protocol among replicas to update a replica configuration. Aspects of the consensus-based protocol can be used to implement replica management, wherein a master replica is configured to periodically communicate with each secondary replica corresponding to the same logical volume and affirm the presence of the master replica. Each secondary replica is also configured to periodically communicate with the master replica corresponding to the same logical volume and affirm the presence of the respective secondary replica. This can beneficially prevent multiple replicas (e.g. multiple secondary replicas or the master replica and one of the secondary replicas) from attempting to become the master replica.

The consensus-based protocol may involve one or more services directed to managing a replica configuration. Aspects of the consensus-based protocol can implement a volume authority service implemented by host computing devices where the volume authority service is responsible for determining a replica configuration of the primary and secondary replicas and generating an updated replica configuration based on a request by one or more of the replicas. As disclosed herein, the volume authority service can utilize a strongly consistent data store, such that only one valid replica configuration exists for a volume at a given time. In one embodiment, the volume authority service stores only one replica configuration at a given time. Aspects of the consensus-based protocol can further implement a volume manager service implemented by host computing devices where the volume manager service is responsible for implementing an updated replica configuration generated by the volume authority service. In some embodiments, the master replica may be configured to request an updated replica configuration from the volume authority service if the master replica is unable to communicate with each of the secondary replicas. Similarly, one or more secondary replicas may be configured to request an updated replica configuration from the volume authority service if the one or more secondary replicas is unable to communicate with the master replica. Further, this can beneficially prevent a single replica from altering the replica configuration without the other replicas being aware. Each of the computing devices storing replicas may be configured to not communicate with the volume authority service until the computing device is requesting an updated replica configuration to allow for greater system efficiency and lower power consumption.

As disclosed herein, each computing device storing a replica of the logical volume or a portion/partition thereof (which are generally referred to herein as a "replica" for simplicity) can be configured with a consensus-based protocol that causes the device to communicate with each other replica to verify a status of each of the replicas. Illustratively, the master replica may be configured to communicate an updated status to each secondary replica periodically at first time intervals. The status of each of the replicas may include a status of the virtualized block storage volume, a status of a server hosting the respective replica, or both. Additionally, the secondary replicas may be configured to communicate a reply to the master replica in response to receiving an updated status from the master replica.

In the instance that a replica does not receive an expected communication according to the protocol disclosed herein, that replica may request an updated replica configuration after a respective time period. These time periods may differ between the primary and secondary replica. For example, the time period implemented at the master replica may be shorter than that implemented at secondary replicas, to ensure that a secondary replica does not act too quickly to request a new configuration (which, because such a request can be taken in response to a lack of communication from the master replica, may request designation of a new master replica). Specifically, a master replica may request an updated replica configuration after a first time period has passed without receiving a communication from any replica of the set of secondary replicas for a volume. The master replica may be configured to request an updated replica configuration including only those secondary replicas which communicated with the master replica during the first time period. Somewhat similarly, each secondary replica may request an updated replica configuration after a second time period has passed without receiving a communication from the master replica. The requesting secondary replica may be configured to request an updated replica configuration removing the current master replica and including a designation of one of the secondary replicas (e.g., itself) as the master replica. As noted above, the first time period may be shorter than the second time period to enable a master replica to request an updated replica configuration before the secondary replica in the case that both the master replica and the secondary replica are unable to communicate with each other.

When changes in replica configuration occur, it may be necessary to ensure that the instances and the volume manager service are communicating with an updated replica configuration of computing devices that are currently storing replicas (primary or secondary) for the logical volume. For example, when a secondary replica is promoted to be a master replica, instances may need to direct reads and writes to the promoted master replica (previous secondary replica) and a previous master replica that has been superseded may need to cease to accept write or read requests in order to avoid supplying stale read data or committing writes at a stale replica. Also, replication in response to writes may need to be performed in accordance with the updated replica configuration.

To assist devices in determining a currently valid replica configuration, the volume authority service may associate each replica configuration with a generation number. Any new replica configuration generated by the volume authority service may be associated with a new generation number (e.g., higher than a past number). In one embodiment, each new replica configuration generated by the volume authority service is given a generation number incrementally more authoritative than a past number, such as by increasing the number by one for each new replica configuration. For example, the loss of a master replica from a replica group for a volume, the promotion of a secondary replica to master replica, the addition of a secondary replica, the loss of a secondary replica, etc. may cause the volume authority service to generate a new replica configuration with a new generation number. Each device interacting with a volume can be configured to utilize the generation numbers to determine an authoritative replica configuration among multiple configurations. For example, each device may identify a configuration having a highest generation number as authoritative.

In some instances, the volume authority service may utilize a latest generation number for a replica configuration to ensure that a computing device requesting an updated replica configuration is authorized to make the request. For example, each request to generate a new replica configuration that is sent to the volume authority service may be required to include a latest generation number. In the case that such a generation number is not included, the volume authority service may consider the request to be unauthorized.

Similarly, replicas of a volume may utilize a latest known generation number to validate communications between replicas. For example, each replica may locally store a latest known generation number, and may include that latest known generation number in communications to other replicas. Replicas receiving communications from other replicas may compare their stored latest known generation number to a generation number included in a communication, and reject communications that include a generation number less authoritative than that locally stored. In the instance that a communication includes a generation number more authoritative than that stored locally, the replica can be configured to request a most-recent replica configuration from the volume authority service.

As would be appreciated by one of skill in the art, embodiments of the present disclosure—including managing a replica configuration of a logical volume based on a consensus-based protocol—represent an improvement in computer-related technology, and more particularly, an improvement in replicated network-accessible block storage devices. Moreover, embodiments of the present disclosure address technological problems, such as increased power consumption and latency based on reliance on an external device for managing the health of the replicas, and the difficulty of preventing multiple replicas from being considered the master replica at a given time. These technical problems are addressed by the technical solutions provided herein, including a consensus based protocol that allows the master replica to heartbeat to each secondary replica and each secondary replica to reply to the heartbeat of the master replica for managing the health of the replicas. Further, the consensus-based protocol includes a generation number to ensure that multiple replicas are not simultaneously granted master replica status. As such, the embodiments described herein represent significant improvements in computer-related technology.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

FIG. 1 depicts an example computing environment 100 including a cloud computing system 120 in which the disclosed consensus-based protocol can be implemented. The cloud computing system 120 may be a cloud provider network (sometimes referred to simply as a "cloud"). The cloud refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud computing system 120. It will be appreciated that the disclosed replication and management techniques may be implemented in non-elastic computing environments as well.

As shown in FIG. 1, the cloud computing system 120 includes a virtual compute service 130 such as elastic compute cloud service (referred to in various implementations as an elastic compute service, a virtual machines service, a computing cloud service, a compute engine, or a cloud compute service). Generally described, the virtual compute service 130 enables customers to create, configure, and manage operation of virtual machine instances 132, each of which represents a configurable, virtualized computing device hosted on a substrate host computing device. Each virtual machine instance 132 may, for example, represent a virtual computing device provisioned with an operating system and various other software and configured according to specification of a customer to provide a network-based service for or on behalf of the customer. For example, virtual machine instances 132 may be configured to provide web servers, databases, transcoding services, machine learning services, or any of a variety of computational tasks. The virtual compute service 130 may provide a variety of types of virtual machine instances 132 representing, for example, processors of different central processing unit (CPU) architectures, different additional processors (e.g., graphically processing units, application specific integrated circuits (ASICS), etc.), different speeds or configurations of such processors, and the like. A variety of techniques for implementing a virtual compute service 130 to provide virtual machine instances 132 are known in the art, and thus operation of the virtual compute service 130 is not described in detail herein.

The virtual compute service 130 may offer virtual compute instances (also referred to as virtual machines, or simply "instances") with varying computational and/or memory resources. In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

While the virtual compute service 130 is shown in FIG. 1 as including virtual machine instances 132, the virtual compute service 130 may in some instances additionally or alternatively provide "bare metal" servers. Generally described, a "bare metal" server refers to a single-tenant physical host device, as opposed to host devices which may have multiple tenants (e.g., different customers) by virtualizing the server using a hypervisor to host multiple virtual machines for the multiple tenants. Bare metal servers might not run a hypervisor or be virtualized, but can still be delivered via a cloud provider network service model. In some scenarios, customers may use bare metal servers to run their own hypervisor, or may run workloads in a non-virtualized environment for direct access to the processor and memory resources of the underlying server.

Further, while the virtual compute service 130 is shown in FIG. 1 as including virtual machine instances 132, the virtual compute service 130 may in some instances additionally or alternatively provide customers with container-based compute resources. A container, as referred to herein, packages up code and all its dependencies so an application (also referred to as a task) can run quickly and reliably from one computing environment to another. A container image is a standalone, executable package of software that includes everything needed to run an application process: code, runtime, system tools, system libraries, and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

Both instances and containers as described herein may "attach" to a volume in order to use the volume as if it were a local disk. For example, a software component referred to as a "client" may run in an instance or container. The client represents instructions that enable a compute instance or container to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance or container.

Because the virtual compute service 130 can be generally configured to provide computation resources (e.g., as opposed to data storage), the cloud computing system 120 further includes a block storage service 140 (referred to in various implementations as cloud disks service, a managed disk service, a storage area network service, a persistent disk service, or a block volumes service) for providing virtualized block storage volumes (referred to in various implementations as cloud disks, storage disks, cloud volumes, disks, block volumes, or simply "volumes") to customers. As used herein, "block storage" generally refers to data storage organized as blocks, which are typically fixed-size data sequences of a given number of bytes (e.g., $2^n$ kilobytes for a specified value of n). Block storage can be contrasted, for example, with object storage systems, which enable access and manipulation of data at the level of an individual object (e.g., a file). Block storage is commonly used as principle storage of a computing device, including a virtual computing devices. For example, most hard disk drives represent block storage devices, and most operating systems (OSs) are intended for installation on block storage devices. As such, the block storage service 140 can provide network-based access to a virtualized block storage volume (e.g., a virtual hard disk drive). For example, virtual machine instances 132 may connect via a network to the block storage service 140 in order to "attach" a virtualized hard drive of the service 140 and store an operating system of the instance 132. In this manner, the need of the virtual compute service 130 to provide data storage is reduced or eliminated, and resiliency of virtual machine instances 132 is increased. For example, migration of an instance 132 may require simply replicating a configuration of the instance 132 on the service 130 to a new host device to create a new instance 132, and attaching to the new instance 132 an existing virtual hard drive provided by the block storage service 140.

In the example of FIG. 1, virtualized block storage volumes of the storage service 140 are provided by storage nodes 150. Each storage node 150 can represent one or more associated computing devices (e.g., co-located within a rack) configured to enable virtual machine instances 132 to write to and read from volumes representing virtualized block storage volumes. In some instances, a virtualized block storage volume may be represented by a single volume made accessible by a one or more storage nodes 150 of the service 140 within the cloud computing system 120.

In FIG. 1, each storage node 150 includes a number of replicas 152 and a number of data stores 154. In this example configuration, a volume is associated with at least two replicas 152: a master replica 152 that accepts reads from and writes to the volume, and a secondary replica 152 to which writes to the volume are duplicated (in case the master replica 152 fails). Writes are illustratively represented as log entries in a journal, with each log entry indicating, for example, bytes written to the volume and a location in the volume to which the bytes are written (e.g., an offset from a beginning byte location in the volume). The master replica 152 is illustratively configured to synchronously replicate write logs to the secondary replica 152, such that replication to the secondary replica 152 must occur before a write is acknowledged to a source device (e.g., an instance 132). Each replica 152 may include a limited amount of storage in order to store a log journal, which storage is preferably configured to prioritize speed over size. For example, storage may be in the form of a solid state disk, flash memory, non-volatile random access memory (NVRAM), or the like. To reduce the size requirements of replica 152 storage, each storage node 150 further includes data stores 154, which may represent any of a variety of persistent data storage devices, such as magnetic disk drives, solid state disk drives, NVRAM, etc. A master replica 152 for a volume is illustratively configured to periodically "flush" it's log journal to the data stores 154, and to record a location within the data stores at which the data was written (e.g., as metadata associating an offset of the volume, as known by the instance 132, with one or more offsets on a data store 154), which record is then also provided to the secondary replica 152. In one embodiment, data written to the data stores 154 is erasure coded to increase resiliency of the stored data. To service reads to a volume, a master replica 152 may utilize its journal as a cache, responding to the read with data identified within the log journal (if such data has not yet been flushed) and otherwise retrieving the data from the data stores 154 at a location indicated by the records maintained at the replica 152. In this manner, writes to a volume are either replicated (e.g., at the primary and secondary replica 152) or resiliently stored (e.g., erasure coded within the data stores 154) such that failure of an individual device within a node 150 is unlikely to cause a loss of data within the volume.

One example implementation of storage nodes is provided within U.S. Patent Application Publication No. 2018/0181330 to Kusters et al., published Jun. 28, 2018 (the "'330 Publication"), the entirety of which is incorporated by reference herein (wherein the "head nodes" and "slides" of the '330 Publication may represent the replicas 152 and data stores 154, respectively). While storage nodes 150 with bifurcated compute and storage devices are shown in FIG. 1, other configurations are possible. For example, simplified storage nodes containing only replicas 152 with their own local storage may be used, which the master replica 152 being responsible for writing data to its own local storage and also replicating data to a secondary replica 152 for similar local storage. However, the configuration described herein may beneficially increase storage efficiency (e.g., by utilizing erasure coding rather than requiring complete redundancy), while also increasing modularity by enabling independent scaling of replicas 152 and data stores 154.

In some embodiments, data written to storage nodes may be encrypted. In one embodiment, encryption may occur at a host device of the virtual machine instance 132. Each volume of a data store may be associated with a unique encryption key, which may illustratively be stored at a key management service 180 (which service represents a secure storage location that maintains and distributes keys only to authorized and authenticated entities). For example, an instance 132 may provide a first key (e.g., a "customer" key) to the key management service 180 when creating a volume, and the key management service 180 may select for the volume a volume key. The key management service 180 can then encrypt the volume key using the customer key, and provide that encrypted volume key to the storage node 150 for storage as metadata related to the volume. When an instance 132 attempts to "attach" the volume as a hard disk, the node 150 may provide the encrypted key to a host device of the instance 132, which may in turn submit a request to the key management service 180 to decrypt the encrypted key. Assuming the host device is authenticated and authorized, the key management service 120 then provides the (unencrypted) volume key to the host device, such that the host device can encrypt all writes to the volume with the volume key.

In addition to the above, the block storage service 140 includes elements that implement a control plane 160. The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, and system state information). The data plane includes customer resources that are implemented on the cloud provider network (e.g., computing instances, containers, block storage volumes, databases, and file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In the case of FIG. 1, the control plane 160 generally refers to systems that manage creation, operation, and deletion of a volume within the cloud computing system 120. Specifically, the control plane 160 can include a volume manager service 162 that operates to receive requests to create a volume, to select a primary and secondary replica 152 for that volume, and to instruct and coordinate operation of the replica 152 and control plane 160 to finalize creation of the volume. In addition to the volume manager service 162, the control plane 160 may include a volume authority service 164, a distributed service which represents one or more devices configured to store information associating a volume to replicas 152 (e.g., a replica configuration). For example, the volume authority service 164 may store a replica configuration designating a first replica 152 as the "master" replica 152 for a volume, and designating a second replica 152 as a secondary replica 152. Each replica 152 may illustratively be configured to verify its authority as a master replica with the authority service 164 prior to accepting writes to a volume. The volume authority service 162 may similarly handle requests to generate an updated or new replica configuration.

Through the volume manager service 162 and the volume authority service 164 and the use of replication technology, the block storage service 140 may maintain availability during network partitions (e.g., impairments in communication links between individual elements of the system 120, such as between or among storage nodes 150, virtual machine instances 132, etc.) and other system failures. For example, the block storage service 140 can store each piece of data on multiple servers, using a fault-tolerant replication protocol. When a network partition occurs, affected servers can be configured to contact the volume authority service 162. In one embodiment, The volume authority service 164 stores a replica configuration, which indicates which storage nodes hold replicas of a given volume and the order in which data should be replicated between the replicas. The replication protocol can cause replicas to use the replica configuration to decide where data should be stored (e.g., which replica should act as master), and enable the configuration to be updated (e.g., at the authority service 164) to point to a new master replica, if that replica changes.

For example, the volume authority service 164 can maintain, for each virtualized block storage volume, a "cell," which may consist of multiple copies of the replica configuration that volume. Each copy may be stored on a different physical server, which may be in communication with one another (e.g., via a physical or logical mesh network topology). Each copy of the configuration data can be referred to as a "node," with a single physical server being capable of storing thousands of nodes. The various nodes of a cell may communicate with one another to determine an authoritative state of the replica configuration. In one embodiment, the nodes communicate using a consensus protocol, such as a protocol within the Paxos family of consensus protocols (a variety of which are known in the art). In some instances, the consensus protocol is configured to provide providing Byzantine fault tolerance. The volume authority service 164 may reduce the blast radius of failures by placing nodes storing a replica configuration close (e.g., in terms of network distance) to the servers hosting a corresponding replica, while avoiding placing nodes so close to a replica so as to introduce co-dependencies (e.g., avoiding nodes and a corresponding replica sharing a power supply). In one embodiment, the volume authority service 164 may place replica configuration such that the effect of both a network partition and a localized failure (e.g. a rack failure) is minimized to maintain availability of each cell and to ensure replica configuration data is accurate and volume data is not corrupted based on an incorrect or inaccessible replica configuration.

While shown as individual elements in FIG. 1, the manager service 162 and authority service 164 may in practice be implemented by multiple devices operating in a distributed manner. For example, the authority service 164 may be implemented by an odd number of redundant devices utilizing a consensus protocol (e.g., a Paxos protocol, simple majority protocol, or other consensus protocol) to ensure consistent designation of a master replica 152 for a volume. In some instances, functionalities of the elements of the control plane 160 may be divided. For example, rather than a volume manager service 162 selecting replicas 152 to implement a volume, the plane 160 may include a dedicated placement service configured to select an appropriate replica configuration for a volume.

Figure 2A:
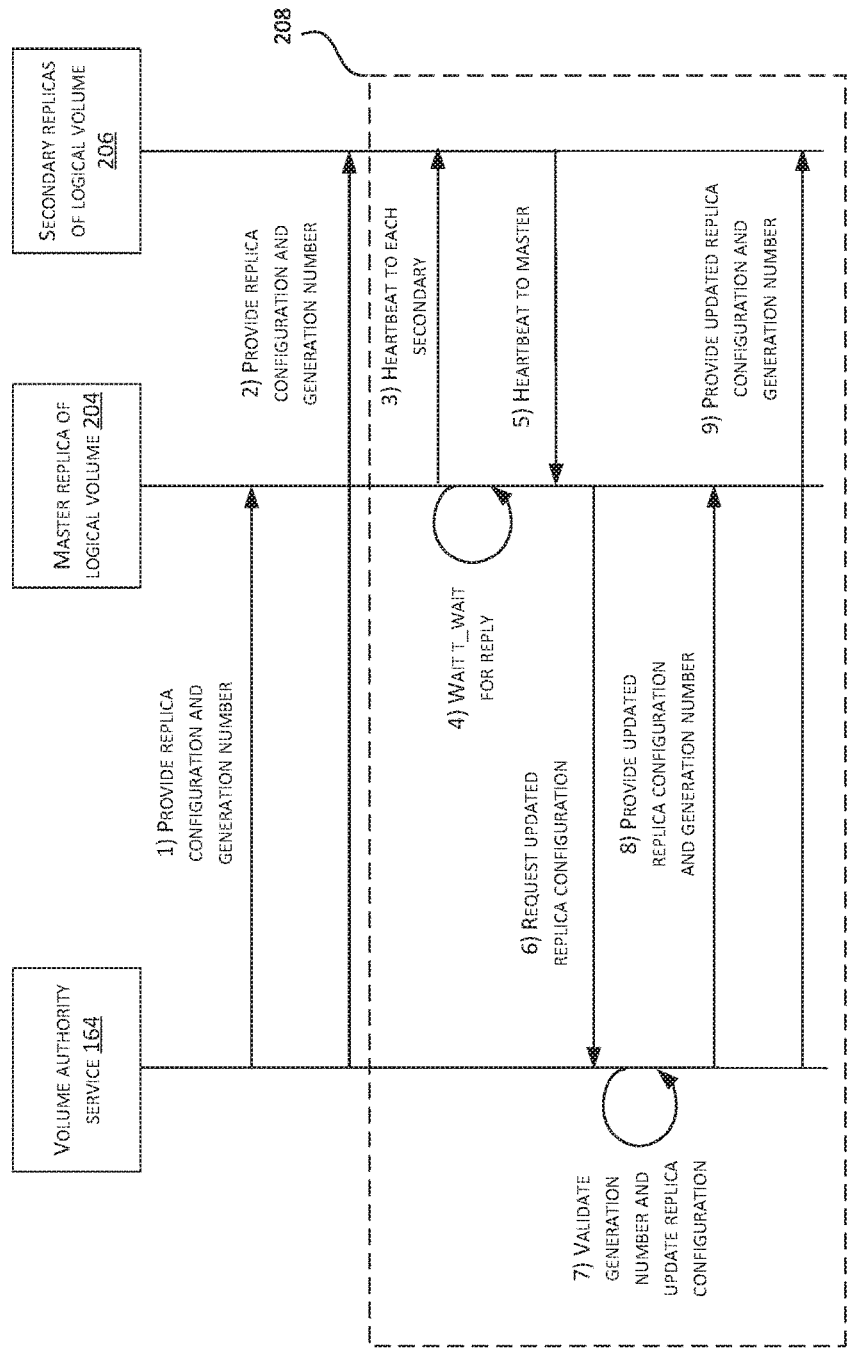
FIG. 2A depicts an example workflow for a master replica requesting an updated replica configuration in response to detected failure of a secondary replica.

With reference to FIG. 2A, illustrative interactions for implementing a portion of a consensus-based authority selection protocol at a master replica 204 of a logical volume will be described. Specifically, the illustrative interactions of FIG. 2A depict how the master replica 204 can utilize "heartbeats" (e.g., communications intended to verify functionality of a sending device to a receiving device) to detect failures of secondary replicas, and request a new replica configuration if such a failure is detected.

The interactions of FIG. 2A begin at (1), the volume authority service 164 provides to the master replica of the logical volume 204 the replica configuration of that volume. The replica configuration can include, for example, designation of a master replica for a volume, designation of one or more secondary replicas, and a generation number for the configuration. Similarly, at (2), the volume authority service 164 provides to each secondary replica 206 the replica configuration of the volume. Interactions (1-2) may occur, for example, during initialization of a volume.

The remaining interactions of FIG. 2A may occur multiple times, and are therefore shown in FIG. 2A as loop 208. Loop 208 is illustratively implemented at each period of a given duration (e.g., every n seconds) during operation of the master replica 204. Specifically, at (3), the master replica of the logical volume 204 "heartbeats" to each secondary replica of the logical volume 206, by sending to each secondary replica 206 a heartbeat communication indicating that the master replica 204 is in a healthy state. The heartbeat illustratively includes a generation number for the replica configuration maintained at the master replica 204.

At (4), the master replica 204 implements a timer of a configured period (designated herein as "$T_{Wait}$")—that provides to each secondary replica of the logical volume 206 time to respond to the respective heartbeat communicated by the master replica of the logical volume 204. Illustratively, each secondary replica 206 can be configured, when a heartbeat from the master replica 204 is obtained, to respond with a corresponding heartbeat thus indicating health of the secondary replica 204. When all secondary replicas are in a healthy state and able to communicate with the master replica 204, it can be expected that the master replica will obtain a heartbeat from all secondary replicas 206 within the configured $T_{Wait}$ period. In such an instance, the master replica 204 can break a current implementation of the loop 208, returning to interaction (3) at a next implementation of the loop 208. Accordingly, at (5), the master replica 204 obtains heartbeat replies if any from the secondary replicas.

However, in the instance that one or more secondary replicas 206 does not respond with a heartbeat during the configured $T_{Wait}$ period, the master replica 204 can consider that secondary replica 206 to have failed. Accordingly, at (6), the master replica 204 requests from the volume authority service 164 an updated replica configuration based on the unavailability of the second subset of secondary replicas. Illustratively, the request may specify a desired replica configuration, as determined by the master replica 204. In one embodiment, the master replica 204 is configured to include in the desired replica configuration a designation of the current master replica 204 as a master replica for the volume and a designation of all secondary replicas 204 (if any) that provided a heartbeat within the configured $T_{Wait}$ period as secondary replicas for the volume.

At (7), the volume authority service 162 validates the request, such as by confirming that the generation number in the request matches a most recent generation number stored at the volume authority service 164. In the instance that the request is valid, the authority service 164 adopts the desired configuration as an updated replica configuration for the volume, and associates a new generation number with the updated configuration. The updated configuration can then be transmitted to the master replica 204 and secondary replicas 206 at (8) and (9), respectively, thus modifying operation of the volume.

While not shown in FIG. 2A, it is recognized that an updated configuration generated in accordance with the interactions of that figure may include less than a desired number of replicas for a volume. Accordingly, elements of the system 120 (e.g., the volume manager service 162) may be configured to detect such an updated configuration and to provision a required number of new secondary replicas in order to reach the desired replication level for a volume. The service 162 or the new replicas may then interact with the volume authority service 164 to request an updated replica configuration including the new replicas, after which all replicas for the volume may be notified of the updated configuration. The interactions of FIG. 2A can therefore enable for automated "failover" in cases of secondary replica failure, e.g., to ensure operation while new replicas are created.

Figure 2B:
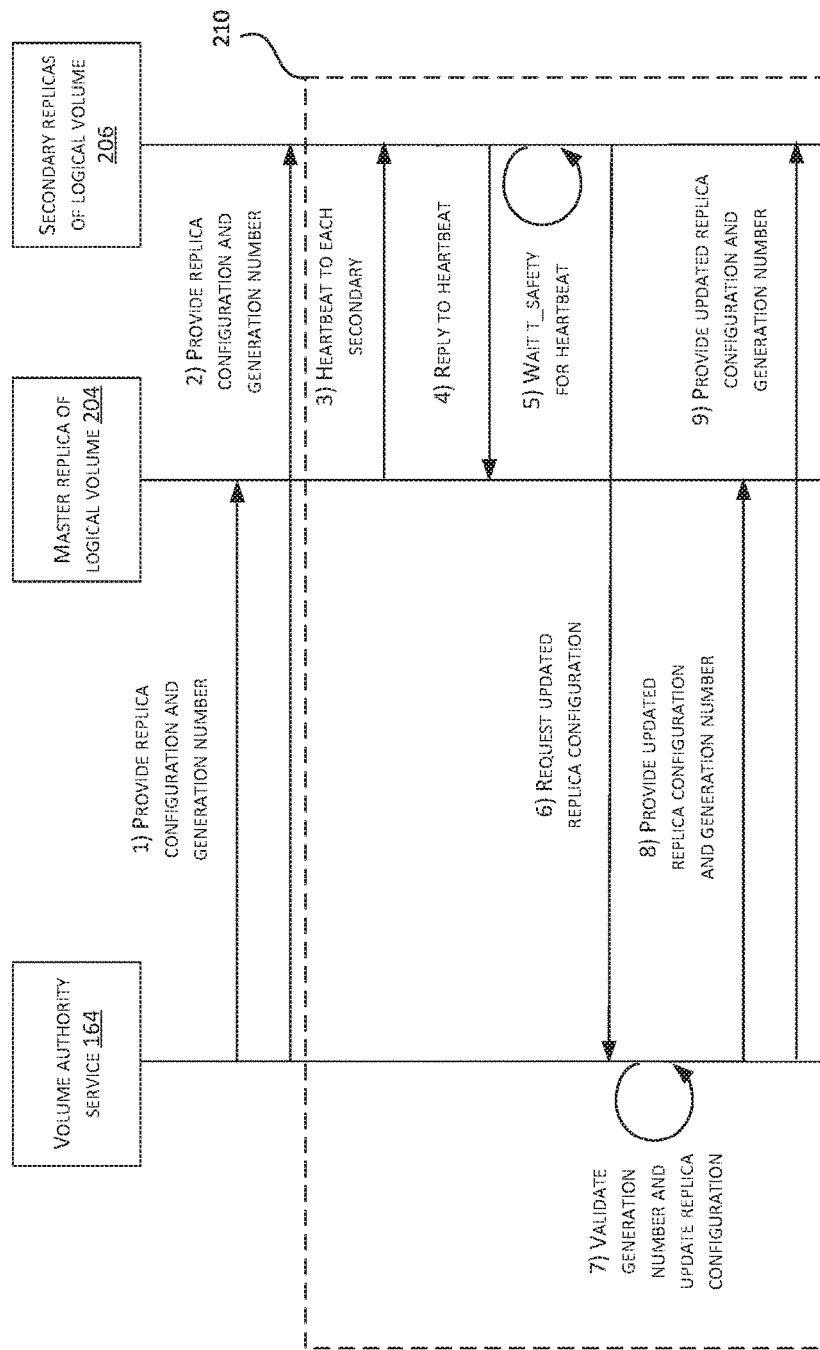
FIG. 2B depicts an example workflow for a secondary replica requesting an updated replica configuration in response to detected failure of a master replica.

With reference to FIG. 2B, illustrative interactions for implementing a portion of a consensus-based authority selection protocol at a secondary replica 206 of a logical volume will be described. Specifically, the illustrative interactions of FIG. 2A depict how the secondary replica 206 can utilize "heartbeats" (e.g., communications intended to verify functionality of a sending device to a receiving device) to detect failure of the master replica, and request a new replica configuration if such a failure is detected.

The interactions of FIG. 2B begin at (1), the volume authority service 164 provides to the master replica of the logical volume 204 the replica configuration of that volume. The replica configuration can include, for example, designation of a master replica for a volume, designation of one or more secondary replicas, and a generation number for the configuration. Similarly, at (2), the volume authority service 164 provides to each secondary replica 206 the replica configuration of the volume. Interactions (1-2) may occur, for example, during initialization of a volume.

The remaining interactions of FIG. 2B may occur multiple times, and are therefore shown in FIG. 2B as loop 210. Loop 210 is illustratively implemented at each period of a given duration (e.g., every n seconds) during operation of the secondary replicas 206. Specifically, at (3), the master replica of the logical volume 204 "heartbeats" to each secondary replica of the logical volume 206, by sending to each secondary replica 206 a heartbeat communication indicating that the master replica 204 is in a healthy state. The heartbeat illustratively includes a generation number for the replica configuration maintained at the master replica 204.

At (4), each secondary replica of the logical volume 206 replies to the heartbeat to the primary replica of the logical volume 204, by sending to the primary replica, from each secondary replica, a heartbeat communication indicating that the respective secondary replica is in a healthy state. The heartbeat illustratively includes a generation number for the replica configuration maintained at each secondary replica 206.

At (5), each secondary replica 206 implements a timer of a configured period (designated herein as $T_{Safety}$) that provides to the primary replica of the logical volume 204 time to respond to the respective heartbeat reply communicated by each secondary replica 206. Illustratively, the primary replica 204 can be configured, when a heartbeat from one of the secondary replicas 206 is obtained, to respond with a subsequent heartbeat thus indicating the continued health of the master replica 204. When the master replica 204 is in a healthy state and able to communicate with each of the secondary replicas 206, it can be expected that the each secondary replica 206 will obtain a heartbeat from the master replica 204 within the configured $T_{Safety}$ period. In such an instance, a secondary replica 206 can break a current implementation of the loop 208, returning to interaction (3) at a next implementation of the loop 208. Accordingly, at (5), a portion of the secondary replicas, if any, obtain subsequent heartbeats from the master replica.

However, in the instance that the master replica 204 does not provide a subsequent heartbeat to one or more secondary replicas 206 during the configured $T_{Safety}$ period, a secondary replica 206 can consider the master replica 204 to have failed. Accordingly, at (6), a secondary replica 206 requests from the volume authority service 164 an updated replica configuration based on the unavailability of the master replica. Illustratively, the request may specify a desired replica configuration, as determined by a secondary replica 206. In one embodiment, the secondary replica 206 is configured to include in the desired replica configuration a designation of the current secondary replicas 206 as secondary replicas for the volume.

At (7), the volume authority service 162 validates the request, such as by confirming that the generation number in the request matches a most recent generation number stored at the volume authority service 164. In the instance that the request is valid, the authority service 164 adopts the desired configuration as an updated replica configuration for the volume, and associates a new generation number with the updated configuration. The updated configuration can then be transmitted to the updated master replica 204 and secondary replicas 206 at (8) and (9), respectively, thus modifying operation of the volume.

While not shown in FIG. 2B, it is recognized that an updated configuration generated in accordance with the interactions of that figure may include less than a desired number of replicas for a volume. Accordingly, elements of the system 120 (e.g., the volume manager service 162) may be configured to detect such an updated configuration and to provision a required number of new secondary replicas in order to reach the desired replication level for a volume. The service 162 or the new replicas may then interact with the volume authority service 164 to request an updated replica configuration including the new replicas, after which all replicas for the volume may be notified of the updated configuration. The interactions of FIG. 2B can therefore enable for automated "failover" in cases of master replica failure, e.g., to ensure operation while new replicas are created.

FIGS. 3A and 3B are each an illustration of example interactions between replicas of a logical volume including failure of a master replica and failure of a secondary replica respectively. The example interactions 302 and 304 illustrate an example replica configuration of a logical volume. In the initial replica configuration of the logical volume, as illustrated by example interactions 302 and 304, the logical volume has three different replicas including replica A, replica B, and replica C. Each of replica A, replica B, and replica C may be hosted or stored on one or more computing devices or nodes. The example interactions 302 and 304 additionally include a volume authority service 164, as described in FIGS. 1-2, to manage the replica configuration of the replicas of the logical volume.

In the example interactions 300 and 302, each of the volume authority service 164, replica A, replica B, and replica C are represented by a line extrapolated across time from left to right. The time may correspond to seconds, minutes, hours, days, or any other designation of time.

FIG. 3A represents example interactions between a volume authority service 164 and several replicas of a logical volume in the instance of a failure of the master replica, specifically illustrating possible actions of each replica in response to determining the failure of the master replica. In the example interaction 300 of FIG. 3A, replica A requests a replica configuration from the volume authority service 164 that designates a set of replicas for the logical volume and that designates one of the replicas as the master replica of the logical volume. The request may illustratively designate a desired replica configuration, such as designating replica A as a master replica and replicas B and C as secondary replicas. In response to this request, the volume authority service 164 generates a replica configuration and a generation number corresponding to the replica configuration. In the example interaction 300, the volume authority service 164 generates a first replica configuration that designates replica A as the master replica and replicas B and C as secondary replicas. In the example interaction 300, the volume authority service 164 generates a generation number designated by GN 1. In other embodiments, the first replica configuration may include different replica designations, more or less secondary replicas, a different generation number, etc. In one embodiment, the first replica configuration may correspond to an updated replica configuration of the logical volume (e.g., requested after failure of another secondary replica for the volume, not shown in FIG. 3A).

The volume authority service 164, subsequent to generating the replica configuration and generation number, provides the replica configuration and the generation number to replica A (which generation number may be included within the information corresponding to the configuration) to enable replica A to maintain the master replica status. In one embodiment, the volume authority service 164 provides the replica configuration and the generation number to each of replica A, replica B, and replica C.

Thereafter, replica A heartbeats to each of the secondary replicas, replica B and replica C, to provide an indication of the status of replica A as the master replica and to provide an indicator of the health of replica A. Replica A may provide the indication of the status of replica A at a first time interval after receiving the replica configuration and generation number from the volume authority service 164. In one embodiment, the heartbeat may include the replica configuration and associated generation number.

Each of replica B and replica C may then validate the heartbeat. In one configuration, each replica validates the heartbeat by ensuring that generation number for the replica configuration indicated within the heartbeat matches a locally-stored generation number. In the instance that the generation numbers do not match, the replica may request an up-to-date replica configuration (and associated generation number) from the volume authority service 164 and attempt to re-validate the heartbeat using that replica configuration. In another configuration, each replica validates the heartbeat by adopting the replica configuration of the heartbeat so long as a generation number provided in the heartbeat matches or exceeds a locally-stored generation number.

After validating the heartbeat, each of replicas A and B provides a reply to replica A, to provide an indication of the status of both replica B and replica C to replica A. Replica B and replica C may reply to replica A at a second time interval after receiving the indication of the status of replica A. In one embodiment, replica B and replica C may acknowledge one or more of the replica configuration or the generation number in reply to replica A.

In response to receiving the indication of the status of replica A from replica A, replica B and replica C may each initialize a clock to ensure that replica A is operating. In other embodiments, replica B and replica C may initialize the clock at the time of replying to the indication of the status of replica A. The clock of each replica B and replica C may be configured to reset when the corresponding replica receives an indication of replica A's status. Replica B and replica C may be configured to wait $T_{Safety}$ to receive a subsequent indication of replica A's status. $T_{Safety}$ may be configured to be any time period and may be measured in seconds, minutes, hours, etc. For example, $T_{Safety}$ may be 500 milliseconds. In one embodiment, $T_{Safety}$ is set to a period longer than a corresponding time period implemented at a master replica (e.g., $T_{Wait}$), such that in the case of mutually-detected failure, a current master replica is expected to request a new replica configuration prior to a current secondary replica. Further, $T_{Safety}$ may be set to a period larger than a corresponding time period implemented at a master replica (e.g., $T_{Wait}$), to compensate for potential clock skew between two or more of the replicas. For example, if a master replica's perception of time proceeds more slowly than a secondary replica's perception of time, the difference between $T_{Safety}$ and $T_{Wait}$ may be set so as to compensate for such clock skew, to ensure that $T_{Wait}$, as measured at the master replica, expires before $T_{Safety}$, as measured at a secondary replica. A difference between $T_{Safety}$ and $T_{Wait}$ may thus be set to account for expected clock skew between a master replica and a secondary replica, such that in the case of mutually-detected failure, the master replica is expected to request a new replica configuration prior to the secondary replica. This configuration can assist in maintaining stability in designation of the master replica (e.g., by preferring to maintain a current master replica rather than designate a new primary in cases where mutually-apparent failure is detected).

In FIG. 3A, it is assumed that after the initially-shown heartbeat of replica A, that replica A fails. Accordingly, as shown in FIG. 3A, after $T_{Safety}$, both replica B and C have not received a subsequent indication of replica A's status and may determine that replica A is no longer available.

In response, replica B and replica C may communicate with the volume authority service 164 to request a desired replica configuration with a new master replica. In one embodiment, each secondary replica is configured to determine a desired replica configuration that designates themselves as master replica, replacing the apparently failed master replica. Accordingly, both replica B and replica C may provide a respective request to the volume authority service 164 to be designated as the master replica to replace replica A. In the illustration of FIG. 3A, the request of replica B is obtained at the volume authority service 164 prior to the request of replica C. Both replicas B and C can be expected to transmit their requests on or around the same time (e.g., at the expiration of $T_{Safety}$). However, the requests are assumed to be ordered as received by the volume authority service 164. The ordering may occur based on a number of factors including system speed, proximity, etc. For example, the computing device hosting the replica B may be configured with a faster processing speed than the computing device hosting the replica C, or replica B may be closer in network distance to the authority service 164. As discussed above, each request can indicate a latest-known generation number of the requesting device to the volume authority service 164, which the volume authority service 164 can use to validate requests. Accordingly, in FIG. 3A, the volume authority service 164 can be configured to verify that the generation number of the request provided by replica B matches a current generation number stored on the volume authority service 164. The volume authority service 164 then generates an updated replica configuration associated with a more authoritative generation number. The updated replica configuration may include a designation of replica B as the master replica and replica C as a secondary replica and the updated generation number may be designated by GN 2. For example, the updated replica configuration may correspond to "B C GN 2." The volume authority service 164 then acknowledges to Replica B that the desired replica configuration has been adopted as authoritative.

Accordingly, in FIG. 3A, the volume authority service 164 can receive the request from replica C at a later time than the request from replica B. The volume authority service 164 can be configured to deny the request of replica C based on the generation number of the request which does not match a current generation number stored on the volume authority service 164 (the current generation number corresponding to the request by replica B). Based on the different generation numbers, the volume authority service 164 may provide an indication to replica C that the request has been denied. In one embodiment, the volume authority service 164 may be configured provide a most current replica configuration and generation number to replica C in response to the request by replica C.

At a subsequent time interval, replica B may heartbeat to the secondary replica, replica C, to provide an indication of the status of replica B as the master replica. Replica B may provide a heartbeat indicating the status of replica B, at a first time interval after receiving the updated replica configuration and updated generation number from the volume authority service 164. Replica C may provide a reply to the heartbeat of replica B to provide an indication of the status of replica C. Replica C may provide a reply to the heartbeat of replica B at a second time interval after receiving the indication of the status of replica B.

FIG. 3B represents example interactions between a volume authority service 164 and several replicas of a logical volume in the instance of a failure of a secondary replica, specifically illustrating possible actions of each replica in response to determining the failure of the secondary replica. In the example interaction 300 of FIG. 3B, replica A requests a replica configuration from the volume authority service 164 that designates a set of replicas for the logical volume and that designates one of the replicas as the master replica of the logical volume. The request may illustratively designate a desired replica configuration, such as designating replica A as a master replica and replicas B and C as secondary replicas. In response to this request, the volume authority service 164 generates a replica configuration and a generation number corresponding to the replica configuration. In the example interaction 300, the volume authority service 164 generates a first replica configuration that designates replica A as the master replica and replicas B and C as secondary replicas. In the example interaction 300, the volume authority service 164 generates a generation number designated by GN 1. In other embodiments, the first replica configuration may include different replica designations, more or less secondary replicas, a different generation number, etc. In one embodiment, the first replica configuration may correspond to an updated replica configuration of the logical volume (e.g., requested after failure of another secondary replica for the volume, not shown in FIG. 3B).

The volume authority service 164, subsequent to generating the replica configuration and generation number, provides the replica configuration and the generation number to replica A (which generation number may be included within the information corresponding to the configuration) to enable replica A to maintain the master replica status. In one embodiment, the volume authority service 164 provides the replica configuration and the generation number to each of replica A, replica B, and replica C.

Thereafter, replica A heartbeats to each of the secondary replicas, replica B and replica C, to provide an indication of the status of replica A as the master replica and to provide an indicator of the health of replica A. Replica A may provide the indication of the status of replica A at a first time interval after receiving the replica configuration and generation number from the volume authority service 164. In one embodiment, the heartbeat may include the replica configuration and associated generation number.

Each of replica B and replica C may then validate the heartbeat. In one configuration, each replica validates the heartbeat by ensuring that generation number for the replica configuration indicated within the heartbeat matches a locally-stored generation number. In the instance that the generation numbers do not match, the replica may request an up-to-date replica configuration (and associated generation number) from the volume authority service 164 and attempt to re-validate the heartbeat using that replica configuration. In another configuration, each replica validates the heartbeat by adopting the replica configuration of the heartbeat so long as a generation number provided in the heartbeat matches or exceeds a locally-stored generation number.

In response to delivering the heartbeat to replica B and replica C, replica A may initialize a clock to ensure that replica B and replica C are operating. In other embodiments, replica A may initialize the clock at the time of heartbeating to replica B and replica C. The clock of replica A may be configured to reset when replica B and replica C respond to the heartbeat provided by replica A. Replica A may be configured to wait $T_{Wait}$ to receive a subsequent reply from replica B and replica C. $T_{Wait}$ may be configured to be any time period and may be measured in seconds, minutes, hours, etc. For example, $T_{Wait}$ may be 300 milliseconds. In one embodiment, $T_{Wait}$ is set to a period shorter than a corresponding time period implemented at a secondary replica (e.g., $T_{Safety}$), such that in the case of mutually-detected failure, a current master replica is expected to request a new replica configuration prior to a current secondary replica. This configuration can assist in maintaining stability in designation of the master replica (e.g., by preferring to maintain a current master replica rather than designate a new primary in cases where mutually-apparent failure is detected).

In FIG. 3B, it is assumed that after the initially-shown heartbeat of replica A, that replica B fails. Accordingly, as shown in FIG. 3B, after $T_{Wait}$, replica A has not received a subsequent indication of replica B's status and may determine that replica B is no longer available.

In response, replica A may communicate with the volume authority service 164 to request a desired replica configuration. In FIG. 3B, replica A requests a replica configuration with replica C as the secondary replica. In one embodiment, replica A requests one or more additional secondary replicas. Accordingly, replica A may provide a respective request to the volume authority 164. As discussed above, the request can indicate a latest-known generation number of the requesting device to the volume authority service 164, which the volume authority service 164 can use to validate requests. Accordingly, in FIG. 3B, the volume authority service 164 can be configured to verify that the generation number of the request provided by replica A matches a current generation number stored on the volume authority service 164. The volume authority service 164 then generates an updated replica configuration associated with a more authoritative generation number. The updated replica configuration may include a designation of replica A as the master replica and replica C as a secondary replica and the updated generation number may be designated by GN 2. For example, the updated replica configuration may correspond to "A C GN 2." The volume authority service 164 then acknowledges to Replica A that the desired replica configuration has been adopted as authoritative.

At a subsequent time interval, replica A may heartbeat to the secondary replica, replica C, to provide an indication of the status of replica A as the master replica. Replica A may provide a heartbeat to replica C at a first time interval after receiving the updated replica configuration from the volume authority service 164. In one embodiment, replica A may provide an indication of the replica configuration to replica C. Replica C may provide a reply to replica A at a second time interval after receiving the heartbeat of replica A.

Figure 4:
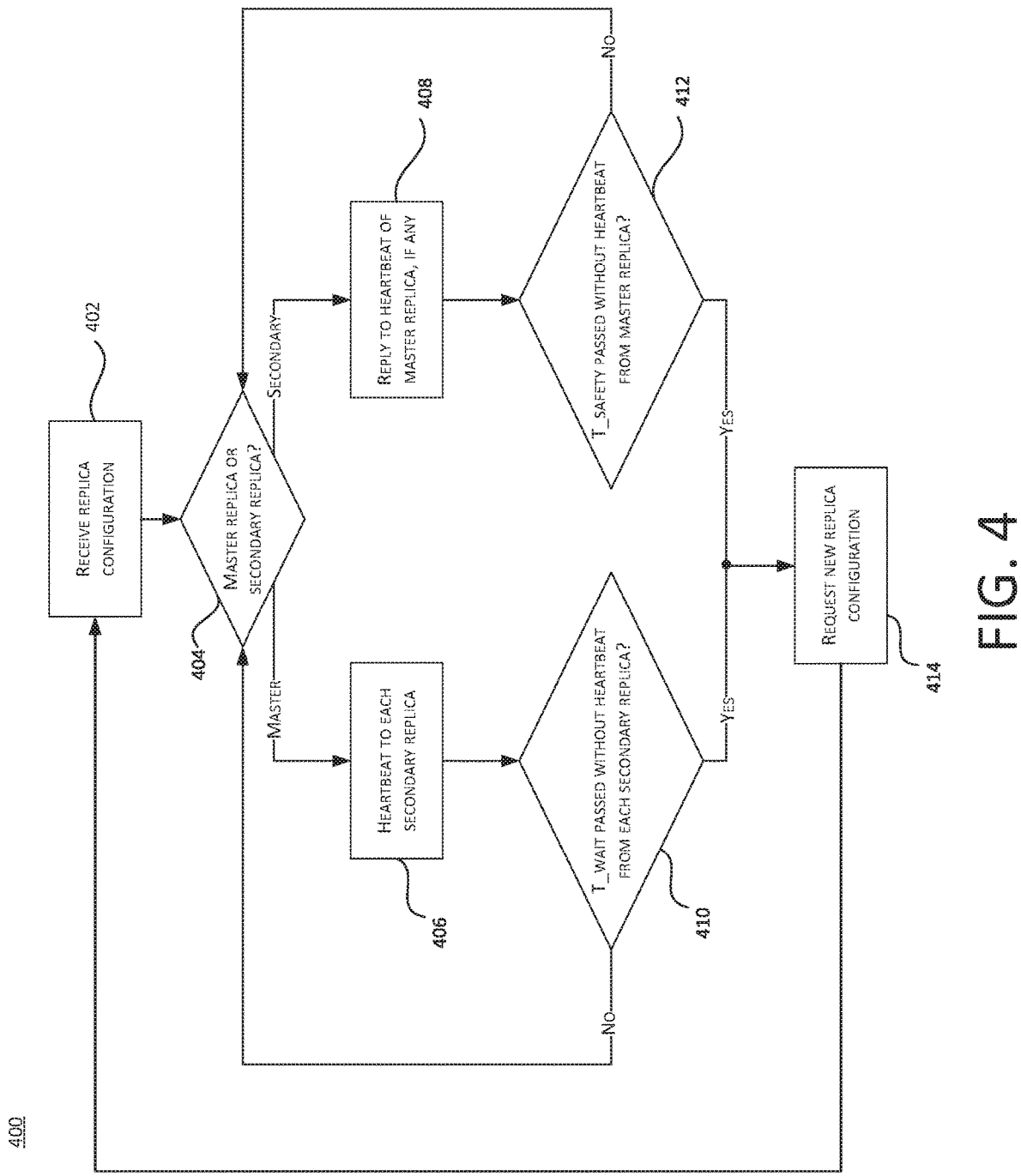
FIG. 4 is a flowchart of an example routine for implementing consensus-based authority selection among replicas of a logical volume.

FIG. 4 is a flowchart of an example routine for implementing consensus-based authority selection among replicas of a logical volume. The routine 400 may be carried out by the storage nodes 150 or the block storage service 140 of FIG. 1.

The routine 400 begins at block 402, a replica may request and receive a replica configuration corresponding to replicas of a logical volume. The replica configuration may designate one or more replicas of a logical volume. The one or more replicas may include a master replica and one or more secondary replicas. The replica configuration may further include a generation number, corresponding to the replica configuration. In one embodiment, the generation number may be used to denote the respective replica configuration. The replica configuration may be received by each of the one or more replicas of the logical volume.

The routine 400 then continues at block 404, where it is determined whether the respective replica is a master replica or a secondary replica. The test may be based on the replica configuration.

If the replica is a master replica, at block 406, the master replica heartbeats to each secondary replica. The master replica may be configured to periodically provide a heartbeat indicating a status of the master replica. At block 408, the master replica determines whether a time period equal to $T_{Wait}$ has passed without a heartbeat being received from each secondary replica. Each secondary replica may be configured to periodically deliver a heartbeat to the master replica. The periodic delivery may be based on the time period $T_{Wait}$. If the master replica has received a heartbeat from each secondary replica within $T_{Wait}$, the clock of the master replica may be configured to reset and the process starts over at block 404. If $T_{Wait}$ has passed without a heartbeat from each secondary replica, at block 414, the master replica may request a new replica configuration.

If the replica is a secondary replica, at block 408, the secondary replica replies to a heartbeat of the master replica, if any heartbeat was received by the secondary replica. One or more secondary replicas may not receive a heartbeat from the master replica and, therefore, may not provide a reply to the master replica. At block 410, the secondary replica determines whether a time period equal to $T_{Safety}$ has passed without a heartbeat being received from the master replica. The master replica may be configured to periodically deliver a heartbeat to the secondary replica. The periodic delivery may be based on the time period $T_{Safety}$. If the secondary replica has received a heartbeat from the primary replica within $T_{Safety}$, the clock of the secondary replica may be configured to reset and the process starts over at block 404. If $T_{Safety}$ has passed without a heartbeat from the master replica, at block 414, the secondary replica may request a new replica configuration.

The routine 400 then continues at block 414, where the replica may communicate with the volume authority service 164 to request a desired replica configuration. The desired replica configuration may include one or more of a new master replica, updated secondary replicas, new secondary replicas, etc. The desired replica configuration may correspond to removal of the non-heartbeating replicas from the replica configuration. The request can indicate a latest-known generation number of the replica to the volume authority service 164, which the volume authority service 164 can use to validate requests. The routine 400 then continues at block 402, where the replica receives the replica configuration from the volume authority service 164. In some instances, the received replica configuration may match that requested. For example, the received replica configuration may designate the replica as a new master replica. In other instances, the received replica configuration may not match that requested. For example, in case of a master replica failure, another secondary replica's request may have been accepted by the authority service 164, and thus the replica configuration may designate a receiving replica as a secondary replica. In either instance, a non-functioning replica can be removed from the replica configuration, and the routine 400 can continue at block 404, as described above. The routine 400 may illustratively be implemented as an "infinite loop" during operation of each replica.

Figure 5:
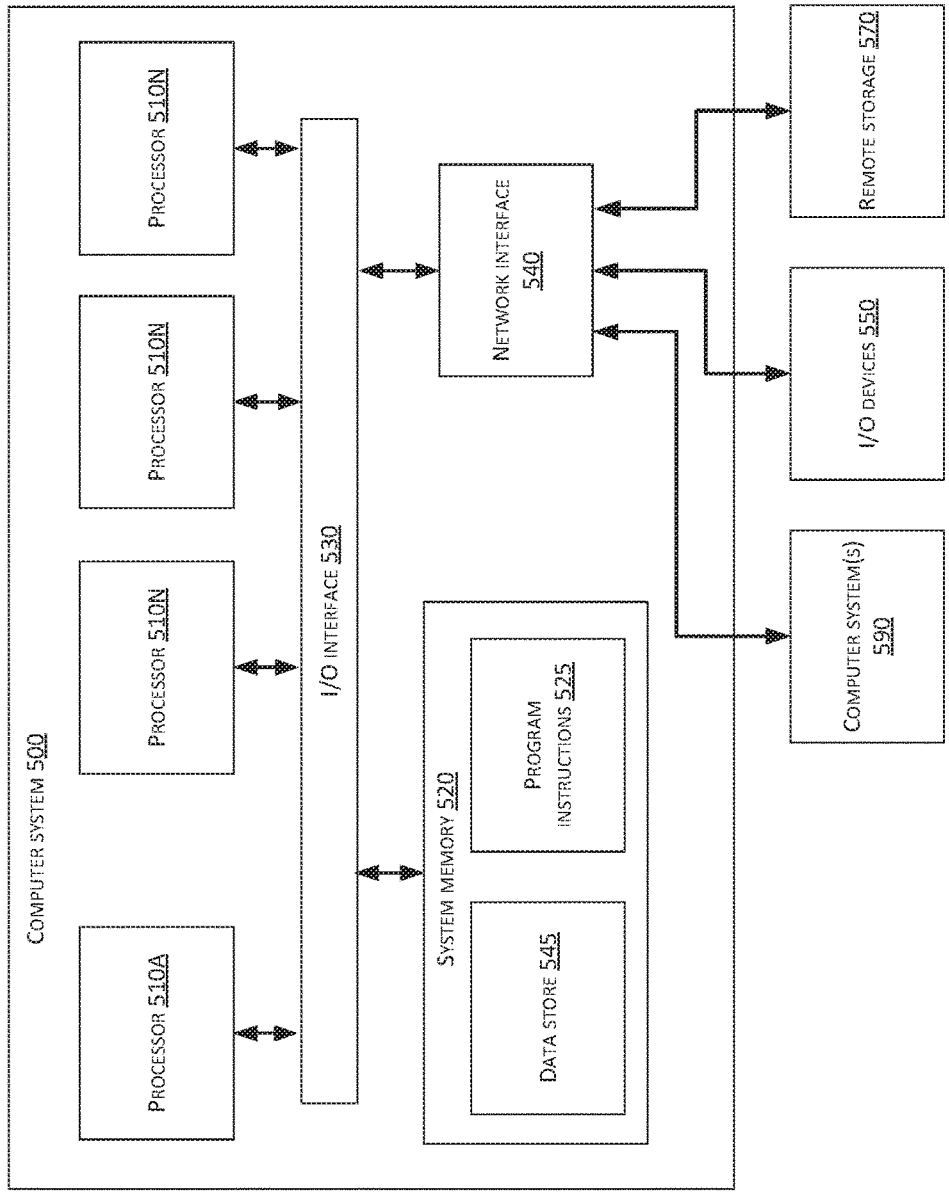
FIG. 5 shows an example computing device that may be used to implement aspects of the present disclosure.

FIG. 5 is a block diagram illustrating an example computer system, according to various embodiments. For example, instances of the computer system 500 may be configured to implement host devices in the virtual compute service 130, elements of the control plane 160, or key management service 180. Computer system 500 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 500 includes one or more processors 510 (any of which may include multiple cores, which may be single or multi-threaded) coupled to a system memory 520 via an input/output (I/O) interface 530. Computer system 500 further includes a network interface 540 coupled to the I/O interface 530. In various embodiments, computer system 500 may be a uniprocessor system including one processor 510, or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA. The computer system 500 also includes one or more network communication devices (e.g., network interface 540) for communicating with other systems and/or components over a communications network (e.g. Internet, LAN, etc.).

Computer system 500 includes one or more system memories 520 that are configured to store instructions and data accessible by processor(s) 510. In various embodiments, system memories 520 may be implemented using any suitable memory technology (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 520 may contain program instructions 525 that are executable by processor(s) 510 to implement the routines, interactions, and techniques described herein. In various embodiments, program instructions 525 may be encoded in platform native binary, any interpreted language such as Java byte-code, or in any other language such as C/C++, Java, etc., or in any combination thereof. For example, in the illustrated embodiment, program instructions 525 may include program instructions executable to implement the functionality of a replica 152. In some embodiments, program instructions 525 may implement a device of the volume manager service 162, the volume authority service 164, or other elements of the cloud computing system 120 or the network 110.

In some embodiments, program instructions 525 may include instructions executable to implement an operating system (not shown), which may be any of various operating systems, such as UNIX, LINUX, Solaris, MacOS, Windows, etc. Any or all of program instructions 525 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 500 via I/O interface 530. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 500 as system memory 520 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 540.

In some embodiments, system memory 520 may include data store 545. In general, system memory 520 (e.g., data store 545 within system memory 520), remote storage 570 may store write journal entries, data blocks, replicas of data blocks, metadata associated with data blocks and/or their state, configuration information, and/or any other information usable in implementing the methods and techniques described herein.

In one embodiment, I/O interface 530 may be configured to coordinate I/O traffic between processor 510, system memory 520 and any peripheral devices in the system, including through network interface 540 or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments, some or all of the functionality of I/O interface 530, such as an interface to system memory 520, may be incorporated directly into processor 510.

Network interface 540 may be configured to allow data to be exchanged between computer system 500 and other devices attached to a network, such as other computer systems 590, for example. In addition, network interface 540 may be configured to allow communication between computer system 500 and various I/O devices 550 and/or remote storage 570 (which may represent, for example, data stores 545). Input/output devices 550 may, in some embodiments, include one or more display terminals, keyboards, keypads, touchpads, scanning devices, voice, or optical recognition devices, or any other devices suitable for entering or retrieving data by one or more computer systems 500. Multiple input/output devices 550 may be present in computer system 500 or may be distributed on various nodes of a distributed system that includes computer system 500. In some embodiments, similar input/output devices may be separate from computer system 500 and may interact with one or more nodes of a distributed system that includes computer system 500 through a wired or wireless connection, such as over network interface 540. Network interface 540 may commonly support one or more wireless networking protocols (e.g., Wi-Fi/IEEE 802.11, or another wireless networking standard). However, in various embodiments, network interface 540 may support communication via any suitable wired or wireless general data networks, such as other types of Ethernet networks, for example. Additionally, network interface 540 may support communication via telecommunications/telephony networks such as analog voice networks or digital fiber communications networks, via storage area networks such as Fibre Channel SANs, or via any other suitable type of network and/or protocol.

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the Clauses are to be embraced within their scope.

What is claimed is:

1. A block storage system configured to host and manage a plurality of logical volumes replicated across a plurality of computing systems, the block storage system comprising:
   a set of host computing devices collectively hosting a virtualized block storage volume, wherein the virtualized block storage volume comprises a primary replica hosted at least partially by a first host computing device and one or more secondary replicas hosted at least partially by one or more second host computing devices, wherein the primary replica is configured to handle user input/output (I/O) to the virtualized block storage volume and to replicate writes to the virtualized block storage volume to the one or more secondary replicas; and
   one or more computing devices configured to implement a volume authority service configured to store a replica configuration of the virtualized block storage volume, wherein the replica configuration identifies the primary replica and the one or more secondary replicas;

wherein the first host computing device at least partially hosting the master primary replica is configured to:
periodically transmit, based on the replica configuration, a heartbeat to each of the one or more second host computing devices, the heartbeat indicating the primary replica is in a healthy state;
determine that a first threshold period of time has elapsed since a most recent heartbeat has been transmitted and that a response to the most recent heartbeat has not been received from at least one secondary replica;
based on determining that the first threshold period of time has elapsed since the most recent heartbeat has been transmitted and that the response to the most recent heartbeat has not been received from the at least one secondary replica, transmit a request to the volume authority service to remove the at least one secondary replica from the replica configuration;
obtain an approval of the request from the volume authority service; and
halt replication, of writes made to the virtualized block storage volume, to the at least one secondary replica based at least in part on the approval of the request.

2. The block storage system of claim 1, wherein the one or more second host computing devices are each configured to:
periodically transmit to the first host computing device, in response to heartbeats received from the first host computing device, a second heartbeat indicating the respective secondary replica is in a healthy state;
determine that a second threshold period of time has elapsed since the most recent heartbeat has been received from the first host computing device, wherein the first threshold period of time is shorter than the second threshold period of time; and
transmit a request to the volume authority service to remove the primary replica from the replica configuration.

3. The block storage system of claim 2, wherein the one or more computing devices that implement the volume authority service are further configured to approve one or more of the request to remove the primary replica from the replica configuration or the request to remove the at least one secondary replica from the replica configuration based at least in part on a current generation number of the one or more computing devices that implement the volume authority service matching a generation number of the requesting replica.

4. The block storage system of claim 2, wherein the one or more computing devices that implement the volume authority service are further configured to provide an updated replica configuration to at least one of the first host computing device or the one or more second host computing devices.

5. A system configured to manage a plurality of replicas of a logical volume, the system comprising:
a plurality of computing devices that implement a virtualized block storage volume comprising a primary replica and one or more secondary replicas, the plurality of computing devices comprising:
a first computing device hosting at least partially the primary replica, and
one or more second computing devices hosting at least partially the one or more secondary replicas,
one or more computing devices that implement a volume authority service configured to store a replica configuration of the virtualized block storage volume, wherein the replica configuration identifies the primary replica and the one or more secondary replicas; and
wherein the first computing device at least partially hosting the primary replica is configured to:
periodically transmit, based on the replica configuration, a heartbeat to each of the one or more second computing devices, the heartbeat indicating the primary replica is in a healthy state,
determine that a first threshold period of time has elapsed since a most recent heartbeat has been transmitted and that response to a most recent heartbeat has not been received from at least one of the one or more second computing devices hosting at least one secondary replica, and
based on determining that the first threshold period of time has elapsed since the most recent heartbeat has been transmitted and that the response to the most recent heartbeat has not been received from the at least one of the one or more second computing devices, transmit a first request to the volume authority service to remove the at least one secondary replica from the replica configuration.

6. The system of claim 5, wherein the primary replica is configured to handle user I/O to the virtualized block storage volume and to replicate writes to the virtualized block storage volume to the one or more secondary replicas.

7. The system of claim 5, wherein the one or more second computing devices are configured to:
periodically reply to the first computing device based at least in part on the first computing device periodically communicating to each of the one or more second computing devices, wherein a second computing device of the one or more second computing devices is further configured to transmit a second request to the volume authority service to remove the primary replica from the replica configuration based at least in part on the second computing device periodically communicating to the first computing device.

8. The system of claim 7, wherein the one or more computing devices that implement the volume authority service are further configured to designate a third computing device as at least partially hosting the primary replica, based at least in part on the second request.

9. The system of claim 7, wherein the first request is further based at least in part on the first computing device determining that a second threshold period of time has elapsed since receiving a reply from one or more second computing devices and the second request is further based at least in part on the second computing device determining that a third threshold period of time has elapsed since receiving a communication from the first computing device, wherein the second threshold period of time is shorter than the third threshold period of time.

10. The system of claim 7, wherein one or more of the first request or the second request comprises a generation number.

11. The system of claim 10, wherein the one or more computing devices that implement the volume authority service are further configured to store a current generation number and to generate an updated replica configuration based at least in part on the generation number matching the current generation number.

12. The system of claim 10, wherein the one or more computing devices that implement the volume authority service are further configured to store a current generation number and to maintain the replica configuration based at least in part on the generation number being different from the current generation number.

13. The system of claim 7, wherein the one or more computing devices that implement the volume authority service are further configured to generate an updated generation number and provide the updated generation number to one or more of the plurality of computing devices, wherein generating the updated generation number is based at least in part on the first request or the second request.

14. The system of claim 5, wherein the one or more computing devices that implement a volume authority service are further configured to designate a third computing device as at least partially hosting a secondary replica, based at least in part on the first request.

15. The system of claim 5, wherein the one or more computing devices that implement the volume authority service comprise a strongly consistent data store, wherein the one or more computing devices that implement the volume authority service are further configured to store one replica configuration at a given time.

16. A computer-implemented method for managing replicas of a virtualized storage volume in a distributed computing system, the method comprising:
periodically transmitting, based on a replica configuration for the virtualized storage volume, by a primary replica of the virtualized storage volume, a heartbeat indicating a status of the primary replica to each of one or more secondary replicas of the virtualized storage volume;
determining, at the primary replica, that a first threshold period of time has elapsed since a most recent heartbeat has been transmitted and that a response to the heartbeat has not been received from a particular secondary replica of the one or more secondary replicas; and
based on determining that the first threshold period of time has elapsed since the most recent heartbeat has been transmitted and that the response to the heartbeat has not been received from the particular secondary replica, transmitting a first request from the primary replica to a volume authority service to remove the particular secondary replica from the replica configuration for the virtualized storage volume, wherein the replica configuration is maintained by the volume authority service and identifies the primary replica and the one or more secondary replicas.

17. The method of claim 16, the method further comprising:
periodically transmitting, by each of the one or more secondary replicas, a reply to the heartbeat to the primary replica;
determining that a second threshold period of time has elapsed since a most recent heartbeat has been received by at least one secondary replica of the one or more secondary replicas; and
transmitting a second request to the volume authority service to remove the primary replica from the replica configuration;
wherein the volume authority service is further configured to approve the second request and to remove the primary replica from the replica configuration.

18. The method of claim 17, wherein the first threshold period of time is shorter than the second threshold period of time.

19. The method of claim 17, wherein one or more of the first request or the second request comprises a generation number.

20. The method of claim 19, wherein the volume authority service is further configured to store a current generation number and to generate an updated replica configuration based at least in part on the generation number matching the current generation number.

* * * * *